US00RE45733E

(19) United States
(12) Reissued Patent
Stokes et al.

(10) Patent Number: US RE45,733 E
(45) Date of Reissued Patent: *Oct. 6, 2015

(54) MEMS MILLIMETER WAVE SWITCHES

(75) Inventors: Robert B. Stokes, Rancho Palos Verdes, CA (US); Alvin M. Kong, Manhattan Beach, CA (US)

(73) Assignee: Northrop Grumman Systems Corporation, Falls Church, VA (US)

( * ) Notice: This patent is subject to a terminal disclaimer.

(21) Appl. No.: 13/238,433

(22) Filed: Sep. 21, 2011

Related U.S. Patent Documents

Reissue of:
(64) Patent No.: 6,873,223
Issued: Mar. 29, 2005
Appl. No.: 10/320,926
Filed: Dec. 16, 2002

U.S. Applications:
(63) Continuation of application No. 11/334,823, filed on Jan. 17, 2006, which is an application for the reissue of Pat. No. 6,873,223.

(51) Int. Cl.
*H01P 1/10* (2006.01)
(52) U.S. Cl.
CPC ..... *H01P 1/10* (2013.01)
(58) Field of Classification Search
CPC ..... H01P 1/10
USPC ..... 333/101, 105, 262; 200/181
See application file for complete search history.

(56) References Cited

U.S. PATENT DOCUMENTS 5,619,061 A 4/1997 Goldsmith et al.
6,069,540 A * 5/2000 Berenz et al. ..... 333/101

(Continued)

FOREIGN PATENT DOCUMENTS

DE 100 31 569 A 2/2001
DE 10031569 2/2001

(Continued)

OTHER PUBLICATIONS

Yao et al., "A Surface Micomachined Miniature Switch for Telecommunications Applications with Signal Frequencies from DC up to 4 GHZ," vol. 2, Jun. 25, 1995, pp. 384-387.
B. Pillans et al., "Ka-Band RF MEMS Phase Shifters," *IEEE Microwave and Guided Wave Letters,* vol. 9, No. 12, Sep. 1999, pp. 520-522.

(Continued)

*Primary Examiner* — My-Trang Ton
(74) *Attorney, Agent, or Firm* — Patti & Malvone Law Group, LLC

(57) ABSTRACT

An RF switch useable up to millimeter wave frequencies and higher frequencies of 30 GHz and above. Four embodiments of the invention are configured as ground switches. Two of the ground switch embodiments are configured with a planar air bridge. Both of these embodiments are configured so that the bridge length is shortened between the transmission line and ground by introducing grounded stops. The other two ground switch embodiments include an elevated metal seesaw. In these embodiments, a shortened path to ground is provided with relatively low inductance by proper sizing and positioning of the seesaw structure. Lastly, broadband power switch embodiment is configured to utilize only a small portion of the air bridge to carry the signal. The relatively short path length results in a relatively low inductance and resistance lowers the RF power loss of the switch, thereby increasing the RF power handling capability of the switch.

16 Claims, 9 Drawing Sheets

(56) References Cited

U.S. PATENT DOCUMENTS

| | | | | |
|---|---|---|---|---|
| 6,218,911 | B1 | 4/2001 | Kong et al. | |
| 6,307,169 | B1 * | 10/2001 | Sun et al. | 200/181 |
| 6,307,452 | B1 * | 10/2001 | Sun | 333/262 |
| 6,570,750 | B1 * | 5/2003 | Calcatera et al. | 361/115 |
| 6,621,387 | B1 | 9/2003 | Hopcroft | |
| 6,678,943 | B1 | 1/2004 | Feng et al. | |
| 6,873,223 | B2 | 3/2005 | Stokes et al. | |
| 2002/0000364 | A1 | 1/2002 | Hong et al. | |

FOREIGN PATENT DOCUMENTS

| | | | |
|---|---|---|---|
| EP | 0 887 879 | A | 12/1998 |
| EP | 0887879 | | 12/1998 |

OTHER PUBLICATIONS

U.S. Appl. No. 11/334,823, filed Jan. 17, 2006, Stokes et al.

Milanovic et al., "Microrelays for Batch Transfer Integration in RF Systems" MEMS2000. Micro Electro Mechanical Systems 2000. vol. 1, Jan. 23, 2000, pp. 787-792.

Yao J J et al., "A Surface Micromachined Miniature Switch for Telecommunications Applications with Signal Frequencies from DC Up to 5 Ghz," vol. 2, Jun. 25, 1995, pp. 384-387.

Charles L. Goldsmith et al., "Performance of Low-Loss RF MEMS Capacitive Switches," *IEEE Microwave and Guided Wave Letters,* vol. 8, No. 8, Aug. 1998.

B. Pillans et al., "Ka-Band RF MEMS Phase Shifters," *IEEE Microwave and Guided Wave Letters,* vol. 9, No. 12, Dec. 1999, pp. 520-522.

* cited by examiner

1. Deposit Thin Metal 1

2. Deposit First Photoresist

3. Pattern PR1

4. Etrch Metal 1 and Strip PR

5. Deposit PR2

6. Pattern and Hardbake/ Flow PR2

7. Deposit PR3

8. Pattern PR3

9. Deposit Thick Metal 2

10. Liftoff Metal 2 and Remove all PR

Cross-section A-A

Cross-section B-B

MEMS MILLIMETER WAVE SWITCHES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue continuation application of co-pending U.S. patent Reissue application Ser. No. 11/334,823, filed on Jan. 17, 2006, which is a re-issue of U.S. patent application Ser. No. 10/320,926, filed on Dec. 16, 2002, which issued as U.S. Pat. No. 6,873,223 on Mar. 29, 2005.*

BACKGROUND OF THE INVENTION

1. Field of the Invention

The present invention relates to millimeter wave switches and more particularly to millimeter wave switches useful at millimeter wave frequencies and higher frequencies with increased power handling capability relative to known switches, amenable to being fabricated using microelectromechanical system (MEMS) technology.

2. Description of the Prior Art

RF switches are used in a wide variety of applications. For example, such RF switches are known to be used in variable RF phase shifters, RF signal switching arrays, switchable tuning elements, as well as band switching of voltage controlled oscillators. In order to reduce the size and weight of such RF switches, microelectromechanical system (MEMS) technology has been known to be used to fabricate such switches. An example of such an RF switch is disclosed in commonly owned U.S. Pat. No. 6,218,911, hereby incorporated by reference. The RF switch disclosed therein includes a pair of relatively parallel spaced apart metal traces. An air-bridged metal beam is disposed between the parallel spaced apart metal traces.

Electrostatic forces are used to deflect the air bridge to contact one of the metal traces. The center beam is attached to a substrate at each end. As such, when electrostatic attraction forces are applied, the beam deflects into a U-shaped configuration, such that a point approximately at the center of the beam, contacts one of the parallel metal traces disposed adjacent the beam. In such a configuration, the RF input is applied to one end of the beam.

Although such a configuration provides satisfactory performance, such a configuration has a relatively high impedance (i.e. relatively high inductive and resistance) which results in relatively high RF power losses, and reduces the RF power capability of the switch.

In order to solve the problem of high RF power losses of such switches, capacitive-type switches using MEMS technology have been developed for use in millimeter wave and microwave applications. Such capacitive-type switches include a lower electrode, a dielectric layer and a movable metal membrane. Electrostatic forces are used to cause the movable metal membrane to snap and make contact with the dielectric layer to form a capacitive-type switch. Examples of these capacitive-type switches are disclosed in: "Performance of Low Loss RF MEMS Capacitive Switches," by Goldsmith et al., IEEE Microwave and Guided Wave Letters, Vol. 8, No. 8, August 1998, pgs. 269, 271; and "Ka-Band RF MEMS Phase Shifters," by Pillans et al., IEEE Microwave and Guided Wave Letters, Vol. 9, No. 12, December 1999, pgs 520-522. Although such capacitive-type switches provide adequate performance in the millimeter wave and microwave frequencies, the dielectric layer in the capacitive-type switches is known to store charges making it unsuitable for commercial applications. Thus, there is a need for an RF switch which provides true metal-to-metal contact which avoids problems associated with capacitive-type switching and also provides increased RF power handling capability relative to known RF switches.

[BRIEF] SUMMARY OF THE INVENTION

Briefly, the present invention relates to various embodiments of an RF switch suitable for use at millimeter wave and higher frequencies of 30 GHz and above. All embodiments of the switch are configured to reduce portions of the switch structure which are not 50 ohm transmission lines in order to reduce the RF power losses of the switch and increase its RF power handling capability. Four embodiments of the invention are configured as ground switches. Two of the ground switch embodiments are configured with a planar air bridge. Both of these embodiments are configured so that the conduction path length in the air bridge is shortened between the transmission line and ground by introducing grounded stops. The other two ground switch embodiments include an elevated metal seesaw. In these embodiments, a shortened path to ground is provided with relatively low inductance by proper sizing and positioning of the seesaw structure. Lastly, a broadband power switch embodiment is configured to utilize only a small portion of the air bridge to carry the signal. The relatively short path length results in a relatively low inductance and resistance which reduces the RF power losses of the switch and increases its RF power handling capability relative to known RF switches.

BRIEF DESCRIPTION OF THE DRAWINGS

These and other advantages of the present invention will be readily understood with reference to the following specification and attached drawings wherein.

DETAILED DESCRIPTION OF THE INVENTION

Figure 1:
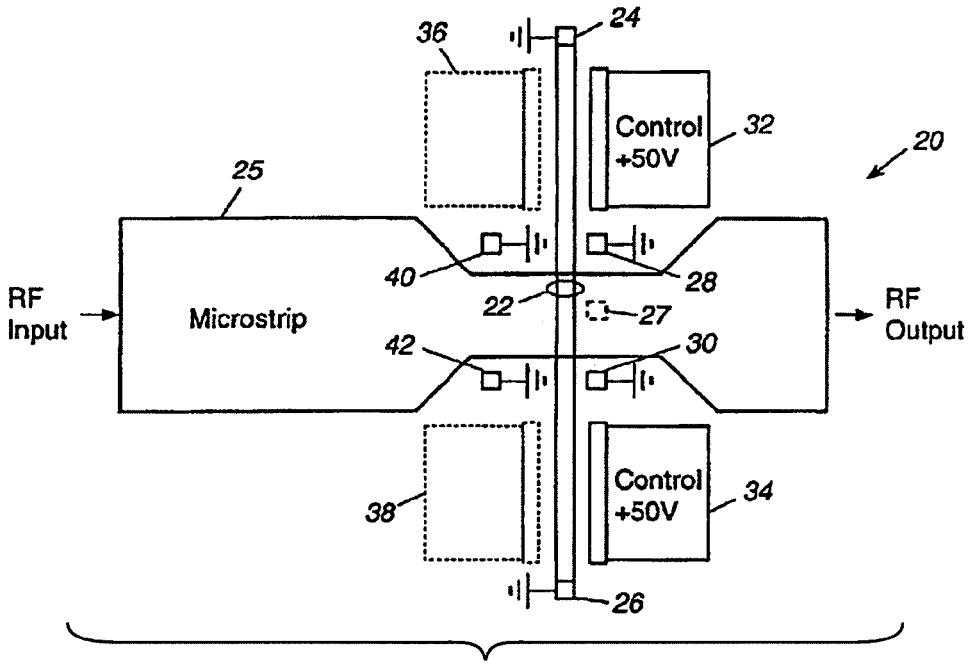
FIG. 1 is a plan view of a ground switch formed with a planar air bridge.
Figure 2:
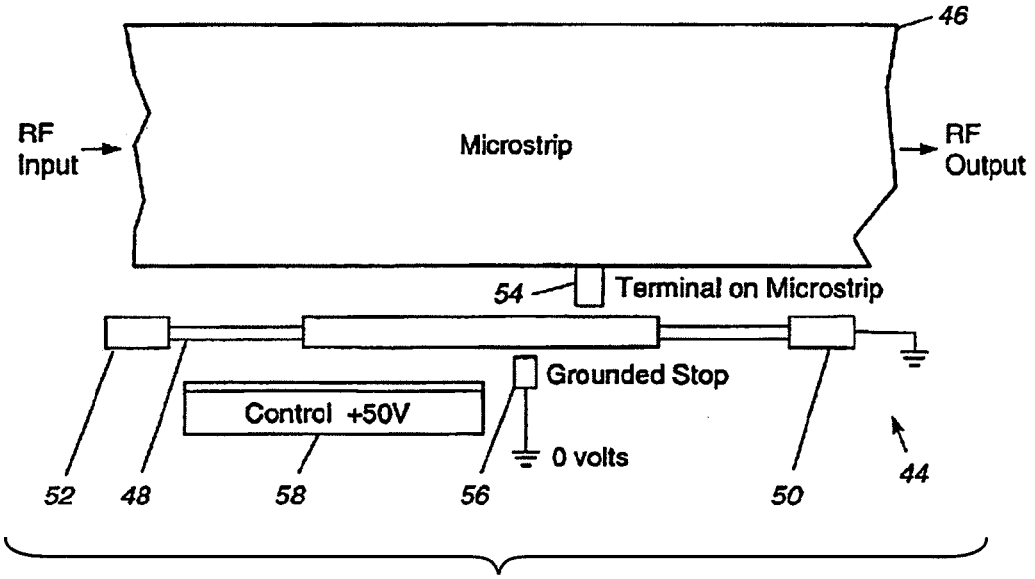
FIG. 2 is a plan view of alternate embodiment of the ground switch with a planar air bridge illustrated in FIG. 1.
Figure 3A:
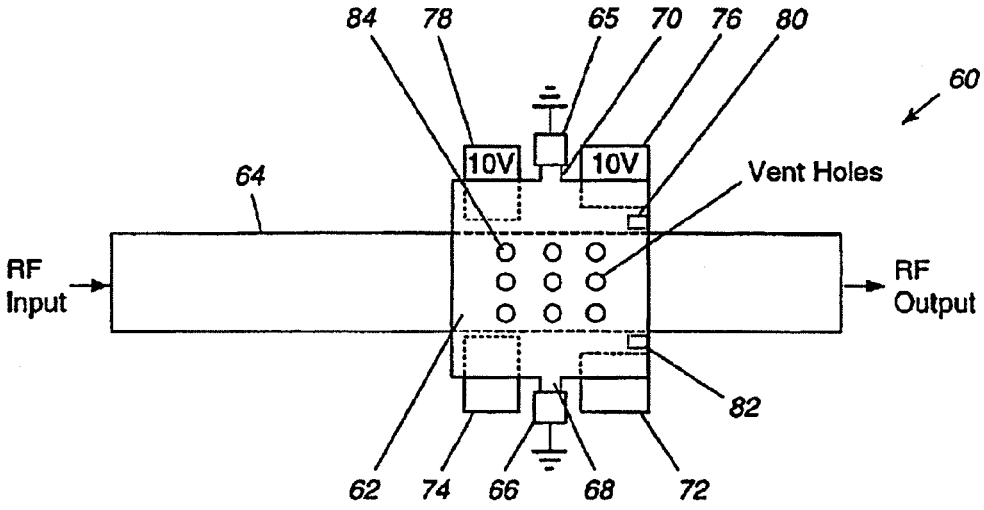
FIG. 3A is a plan view of another embodiment formed as a ground switch with an elevated metal seesaw mounted between two fixed posts by way of torsion bars.
Figure 3B:
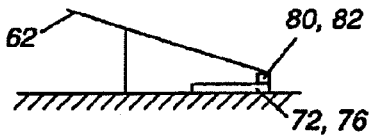
FIG. 3B is an elevational view of the embodiment illustrated in FIG. 3A, shown in a clockwise position.
Figure 3C:
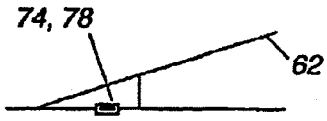
FIG. 3C is similar to FIG. 3B, but shown in a counterclockwise position.
Figure 4:
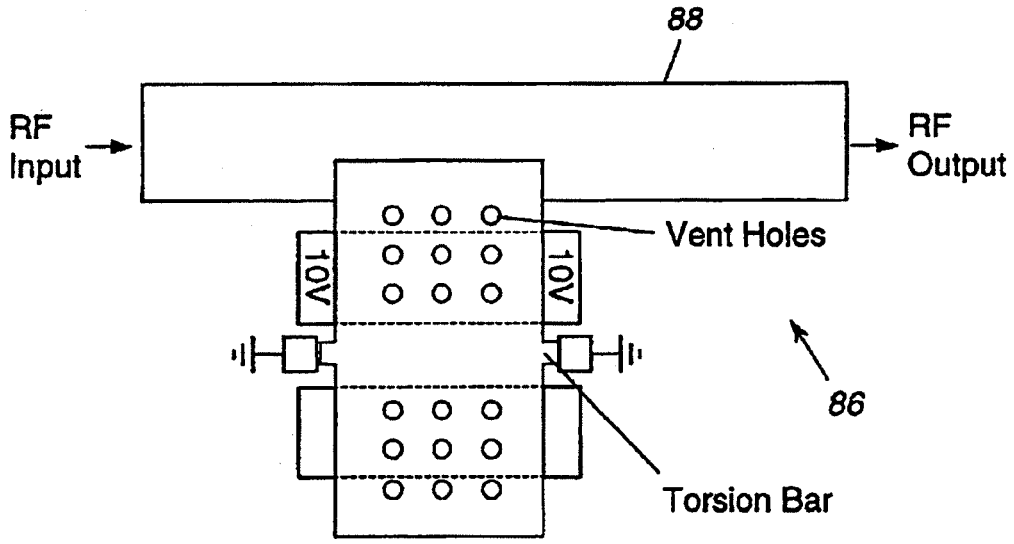
FIG. 4 is a plan view of an alternate embodiment of the ground switch illustrated in FIG. 3.
Figure 5:
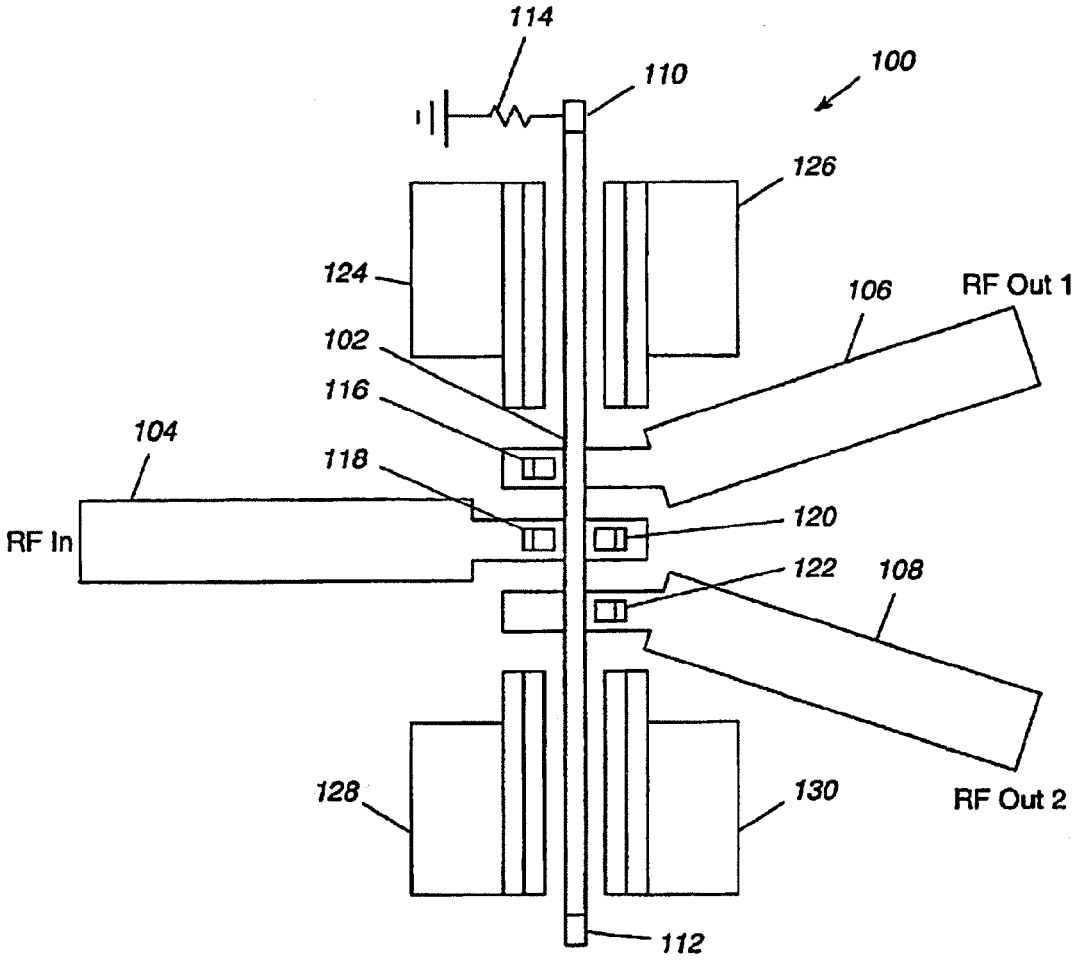
FIG. 5 is a plan view of single pole double throw broadband power switch in accordance with an alternate embodiment of the invention with a transverse air bridge shown with no control bias applied.
Figure 6:
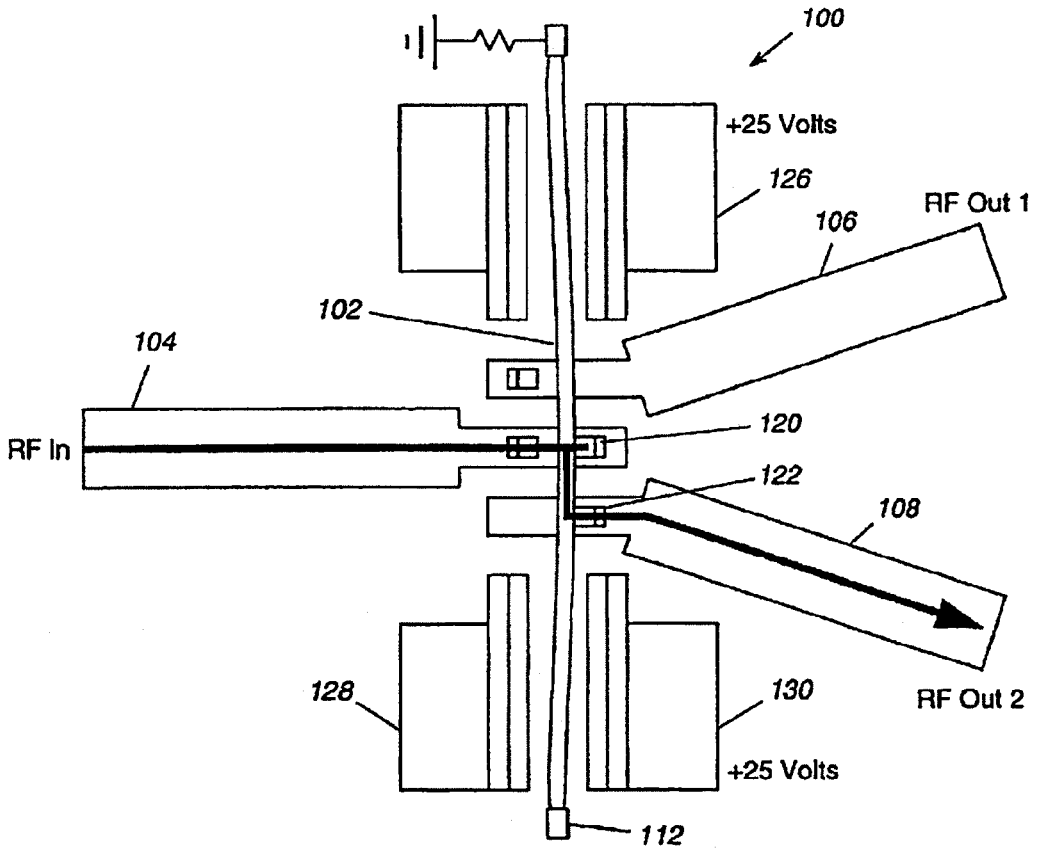
FIG. 6 is similar to FIG. 5 but shown with a bias applied to the right control electrodes.
Figure 7:
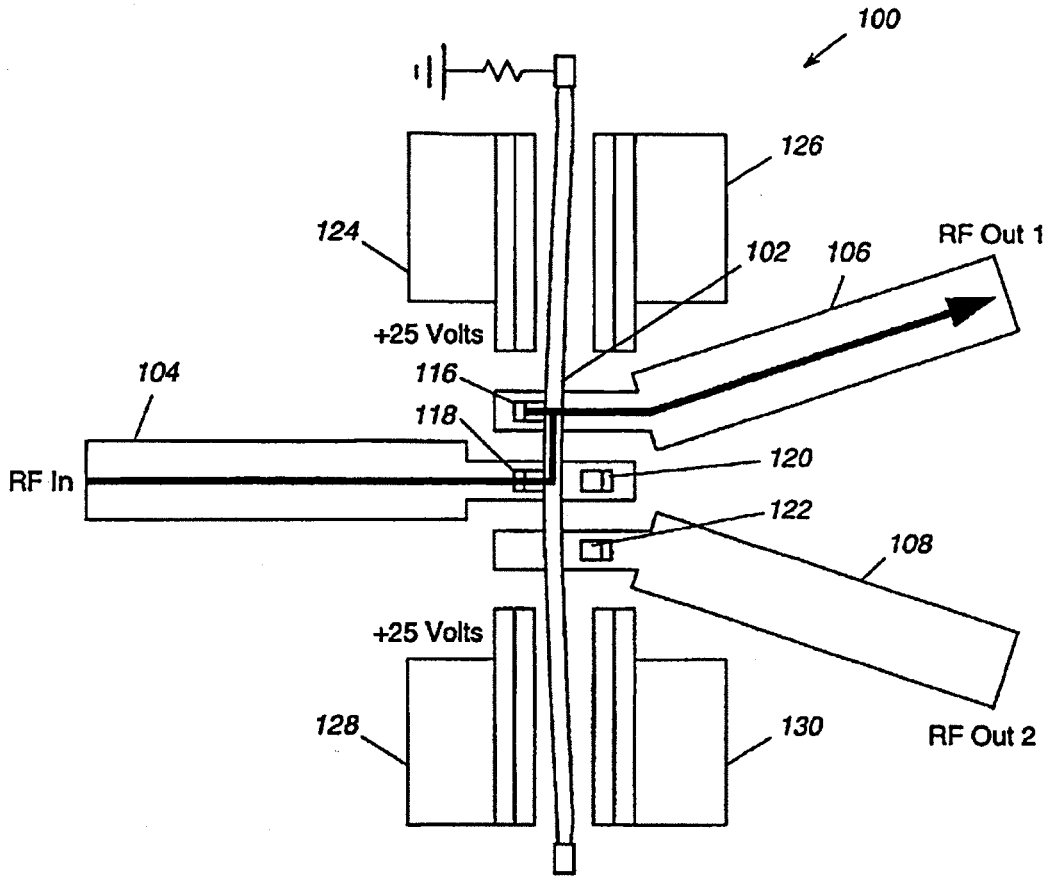
FIG. 7 is similar to FIG. 5 but shown with a bias applied to the left control electrodes.
Figure 8:
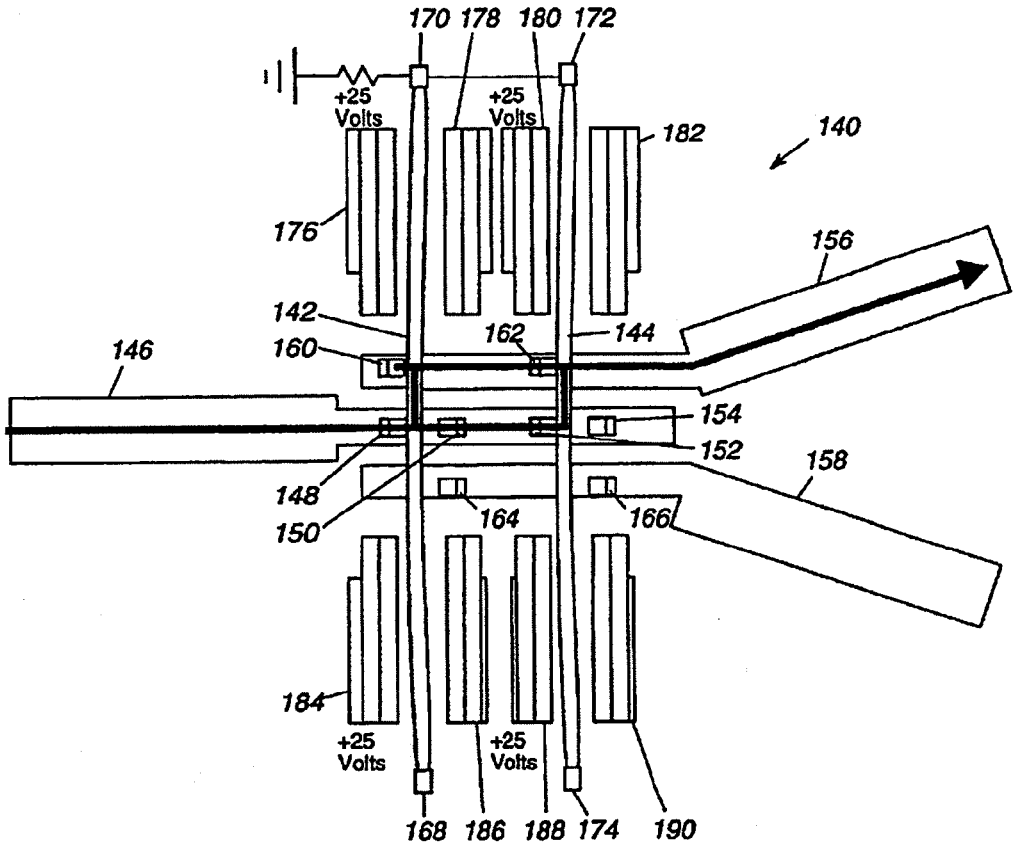
FIG. 8 is similar to FIG. 5 but configured with two air bridges.

In accordance with the present invention, various embodiments of millimeter wave switches are illustrated in FIGS. 1-8. In particular, FIGS. 1 and 2 illustrate ground switches which incorporate a planar air bridge. FIGS. 3A and 4 illustrate alternate embodiments of a ground switch formed with an elevated seesaw connected between two fixed posts by way of torsion bars. FIGS. 5-7 illustrate an embodiment of a broadband power switch, shown, for example, as a single pole double throw switch. Finally, FIG. 8 illustrates an embodiment of the broadband power switch, illustrated in FIG. 7, but formed with a pair of transverse air bridges.

In all embodiments, the path lengths between the transmission line and ground are shortened relative to known RF switches. By shortening these path lengths, the inductance and resistance of the structure is thereby lowered, thereby lowering the RF power losses of the switch and increasing its power handling capability.

Two embodiments of a grounding switch formed with a planar air bridge illustrated in FIGS. 1 and 2 are useful as an RF switch at millimeter wave frequencies and higher frequencies of 30 GHz and above. Both of these embodiments may be fabricated utilizing microelectro-mechanical switch (MEMS) technology, for example, as disclosed in commonly-owned U.S. Pat. No. 6,218,911, hereby incorporated by reference. FIG. 1 is an embodiment with a transverse air bridge, while FIG. 2 is configured with a parallel air bridge. As will be discussed in more detail below, both embodiments utilize grounded stops which shorten the conduction path length in the bridge between the transmission line and ground, thereby reducing the impedance and RF power loss of the switch.

Referring first to FIG. 1, a first embodiment of the millimeter wave grounding switch is illustrated and generally identified with the reference numeral 20. The grounding switch 20 includes an air bridged beam 22, for example, 2 micrometers wide, 2 micrometers thick and 300 micrometers long, formed between two end posts 24 and 26, which, in turn, are attached to a substrate (not shown). The end posts 24 and 26 are, in turn, connected to ground. A microstrip transmission line 25, carried by the substrate (not shown), is formed transverse to the air bridge beam 22. In this embodiment, an RF input is applied to one end of the microstrip transmission line 25, while an RF output is available at an opposing end of the microstrip transmission line 25. In operation, during a condition when there is no deflection or actuation of the millimeter wave switch 20, as shown, the RF input applied to the microstrip transmission line 25 passes through unaffected. However, as will be discussed in more detail below, actuation of the millimeter wave switch 20 causes the microstrip transmission line 25 to be effectively grounded, thereby reflecting 100% of the RF input, thereby emulating an open switch.

A fixed RF contact 27 is formed, for example, on the microstrip transmission line 25 or a co-planar RF transmission line with an impedance of about 50 ohms (not shown). The contact 27 connects the beam 22 to the microstrip transmission line 25 in an actuated position. In accordance with an important aspect of the invention, one or more ground stops 28, 30, formed, for example, adjacent the microstrip transmission line 25 as shown, effectively reduce the path length of the air bridge 22, thereby reducing the impedance and RF power losses of the switch 20. As shown the ground stops 28, 30 are formed on the same side of the air bridge 22 as the fixed RF contact 27.

By appropriate placement of the ground stops 28, 30, the effective path length can be made to be about 50 micrometers or less. A relatively short path length provides a relatively good RF ground for the microstrip transmission line 25 up to millimeter wave frequencies. As such, the RF ground makes an effective RF reflection in the microstrip transmission line 25 when the beam 22 is attracted thereto allowing effective switching in circuits, such as a Ka-band phase shifter. In contrast, the path length of the RF switch disclosed in commonly owned U.S. Pat. No. 6,218,911 is approximately half the length of the air bridge or about 150 micrometers.

Two control pads 32 and 34 are provided. These control pads 32, 34 are used to cause deflection of the beam 22 by electrostatic forces. As such, when a bias voltage, *for example, +50V,* is applied to each of the control pads 32, 34, the beam 22 is deflected by electrostatic force so as to be electrically connected to the fixed RF contact 27 and fixed grounded stops 28, 30, effectively producing a relatively short path from the microstrip 25 transmission line to ground.

The reliability of the ground switch 20 may be increased by adding one or more optional control pads 36, 38 to the left side (FIG. 1) of the beam 22 and one or more additional ground stops 40, 42. The additional control pads 36, 38 and ground stops 40, 42 allow the beam 22 to break away from the actuated position by force in case it sticks. Additionally, the additional control pads 36, 38 and ground stops 40, 42 allow for symmetrical switch movement in both directions with the same amount of bending in each direction which tends to prevent any permanent bending from occurring in the beam 22. Alternatively, the stops 40, 42 may be configured as electrically "floating" so that the switch is grounding when the bridge is pulled to the right, and non-grounding when the bridge is pulled to the left.

An alternative embodiment of the ground switch 20 is illustrated in FIG. 2. Referring to FIG. 2, the ground switch, generally identified with the reference numeral 44, is disposed generally in parallel and adjacent to the microstrip transmission line 46, formed on a substrate, not shown. The ground switch 44 operates in a similar manner as the ground switch 20.

An air bridge beam 48 is formed on the substrate (not shown) and connected thereto by way of two end posts 50 and 52, formed, for example, by a 2 micrometer metal deposition on the substrate. In this embodiment, the air bridge beam 48 is parallel to the microstrip transmission line 46. *An RF Input is available on one end of the microstrip 46 and an RF Output is available on the other end.* A terminal 54 is formed between the microstrip transmission line 46 and the beam 48. A grounded stop 56 is positioned adjacent the beam 48 on a side opposite the terminal 54. A control pad 58 is disposed adjacent the beam 48 on the same side as the grounded stop 56.

When a biasing voltage, either positive, *for example +50V,* or *a* negative *voltage*, is applied to the control pad 58, the left side of the beam (i.e. portion of the beam left of the grounded stop 56 as viewed in FIG. 2) is attracted to the control pad 58. Because of the rigidity of the beam, the beam 48 is twisted so that a right portion is deflected toward the microstrip transmission line 46 and contacts the terminal 54 on the microstrip transmission line 46 as well as the grounded stop 56. In this position, the microstrip transmission line 46 is connected to ground with a length of only about 25% of the total air bridge length. By reducing the path length to about 25%, the millimeter wave switch 44 has reduced RF power loss and increased power handling capability.

FIGS. 3A and 4 illustrate ground switches configured as seesaws in accordance with alternate embodiments of the invention which provide a relatively short path to ground, thereby resulting in a relatively low inductance. The short path length in the case of the seesaw-type switches is made possible by proper sizing and positioning of the seesaw structure. In particular, the relatively wide dimensions of the seesaw result in a relative low inductance. As such, by reducing the inductance, the millimeter wave switch 60 will have lower RF power losses. In the embodiment illustrated in FIG. [3] *3A*, a seesaw structure straddles a transmission line and connects it to grounds on both ends. In the embodiment illustrated in FIG. 4, the seesaw is disposed adjacent one edge of a transmission line and grounds the one edge.

Referring to [FIG.] *FIGS.* 3A-*3C*, a first embodiment of the seesaw grounding switch, generally identified with the reference numeral 60 (*FIG. 3a*), is illustrated. In this embodiment, an elevated metal seesaw 62 is provided. The seesaw 62 is located above a microstrip transmission line 64 (*FIG. 3a*) that is mounted, in turn, to a substrate (not shown). *An RF Input is available on one end of the microstrip 64 and an RF Output is available on the other end.* The seesaw 62 is mounted to two fixed posts 65, 66, connected to the substrate by way of a pair of torsion bars 68 and 70, *as shown in FIG. 3a*. The end posts 65 and 66 are grounded. Thus, when the seesaw 62 rotates clockwise or counter-clockwise about an axis through the end posts 65, 66, generally perpendicular to a longitudinal axis of the transmission line 64, the microstrip 64 is grounded by way of the seesaw 62.

Various control pads 72 (*FIGS. 3a, 3b*), 74 (*FIGS. 3a, 3c*), 76 (*FIGS. 3a, 3c*), and 78 (*FIGS. 3a, 3b*) may be provided. These control pads 72-78 are disposed on the substrate beneath the seesaw 62. When a bias voltage, *for example 10 V,* is applied to the control pads (*as shown in FIG. 3a*), electrostatic attraction forces cause the seesaw 62 to rotate. More particularly, when a bias voltage is applied to the control pads 72 and 76, the seesaw 62 will rotate in a clockwise direction. Similarly, when a bias voltage is applied to the control pad 74 and 78, the seesaw 62 rotates in a counterclockwise direction. As will be discussed in detail below, the seesaw 62 does not contact any of the control pads [72-78] *72, 74, 76 and 78* in a full clockwise or counter-clockwise position.

Such an arrangement provides a mechanical push-pull configuration. Accordingly, if the switch 60 sticks in one position, it can be returned to a normal position by removing the biasing voltage from the control pads in the stuck position and applying a biasing voltage to the opposite control pads. For example, if the switch is stuck in a position whereby the seesaw 62 is stuck in a clockwise position, the biasing voltage is removed from the control pads 72 and 76 and applied to the control pads 74 and 78. Application of the biasing voltage to the control pad 74 and 78, in turn, causes the seesaw 62 to rotate in a counterclockwise direction, thus returning the seesaw 62 to an at rest position.

Like the grounding switches illustrated in FIGS. 1 and 2, the switch 60 also causes a grounding of the RF input signal and thus may be used as a ground switch for the microstrip transmission line 64. A terminal may be formed on the microstrip 64 beneath the seesaw 62. The terminal (not shown) may be used as a contact point.

In order to prevent the seesaw 62 from contacting the control pads 72, 76 when the millimeter wave switch 60 is actuated in the clockwise direction, optional electrically "floating" stops 80, 82 may be provided on the substrate, under the right end of the seesaw 62. These stops 80, 82 may be used to prevent the seesaw 62 from contacting the microstrip transmission line 64 when the switch is in the clockwise non-grounding position as shown in FIG. 3B. When a bias voltage is applied to the control pads 74 and 78, this causes the switch 60 to rotate in a counterclockwise position, as shown in FIG. 3C, causing the seesaw 62 to ground the microstrip transmission line 64. In order to open the grounding switch 60, a bias voltage is applied to the opposing control pads 72, 76, which, in turn, causes the seesaw 62 to rotate in a clockwise direction, thus breaking the connection between the left side of the seesaw 62 (FIG. 3A) and the microstrip transmission line 64. The stops 80, 82 which are not grounded, prevent the seesaw from re-contacting the microstrip transmission line 64 when a biasing voltage is applied to the opposite side control pads 72, 76.

The seesaw 62 may optionally be provided with one or more vent holes 84. The vent holes 84 facilitate the fabrication process as well as increase the speed of operation of the switch 60. In particular, the vent holes 84 facilitate removal of a sacrificial layer needed in fabrication. In addition, the vent holes 84 reduce the drag in the atmosphere, as well as lower the mass, thus making the switch faster.

The embodiment illustrated in FIG. 4, generally identified with the reference numeral 86, is similar to the embodiment illustrate in FIG. 3A *and includes vent holes and a torsion bar* except that the millimeter grounding switch 86 is disposed adjacent to a microstrip transmission line 88. *An RF Input is available on one end of the microstrip 88 and an RF Output is available on the other end.* In this embodiment, the seesaw rotates about an axis generally parallel to the longitudinal axis of the microstrip 88. This embodiment allows for more room for the control pads and also allows for switching at lower voltages, *for example, 10V,* but otherwise is virtually the same as the millimeter wave switch 60 described and illustrated in conjunction with FIG. 3A.

FIGS. 5-8 illustrate a broadband power switch configured as a single pole double throw switch. Not only can the broadband power switch provide operation at relatively high frequencies, but can also carry relatively high RF Power. FIGS. 5-7 illustrate one embodiment of the broadband power switch, while FIG. 8 illustrates an alternate embodiment.

Referring first to FIGS. 5-7, a broadband power switch, in accordance with the present invention, is illustrated and generally designated with the reference numeral 100. The embodiments illustrated in FIGS. 5-7 relate to a single pole double throw switch formed from a single RF input microstrip transmission line and two RF output microstrip transmission lines. Other configurations are also contemplated, such as a single pole single throw which includes a single input microstrip transmission line and a single output microstrip transmission line.

FIG. 5 illustrates the broadband power switch 100 with no biasing voltage applied. The broadband power switch 100 includes a transverse beam 102, formed as an air bridge, formed generally traverse to a plurality of microstrip transmission lines 104, 106 and 108. The microstrip transmission line 104 forms an RF input line, while the microstrip transmission lines 106 and 108 form RF output lines RF out 1 and RF out 2, respectively. Unlike the ground switches illustrated in FIGS. [1-14.] *1, 2, 3a and 4,* the broadband power switch 100 selectively connects an RF input transmission line 104 to one of two RF output transmission lines 106 and 108 forming a single pole double throw switch.

The air bridge beam 102 is rigidly attached to a substrate (not shown) by way of end posts 110, 112 formed on each end from a thick metal layer directly on the substrate. One or both of the end posts 110, 112 is terminated by an RF grounding impedance 114 and thereby connected to ground to allow charge flow so that the air bridge beam 102 can be attracted to the control pads.

As shown, two terminals 118, 120 are formed on the input microstrip transmission line 104 while a single terminal 116, 122 is formed on each of the output RF transmission lines 106, 108, respectively. Additionally, the terminals 116, 118 are formed on one side of the beam 102 while the terminals 120, 122 are formed on an opposing side of the beam 102. The terminals 116, 118, 120, 122 are formed by an additional metalization layer on top of the microstrip transmission lines 104, 106 and 108 to a height that enables contact with the beam 102 when it is deflected either to the right or to the left to that shown in FIG. 5.

A plurality of control pads 124, 126, 128 and 130 are provided in order to cause the beam to be deflected by electrostatic force. In particular, the control pads 124 and 128 are formed on one side of the beam 102, while the control pads 126 and 130 are formed on an opposing side of the beam. As shown in FIG. 6, application of a biasing voltage, *for example, +25V,* to the control pads 126 and 130 causes the beam 102 to deflect to the right, causing the beam to contact the terminals 120 and 122, thereby connecting RF input microstrip transmission line 104 to the RF output microstrip transmission line 108. Similarly, when a biasing voltage, *for example +25V,* is applied to the control pads 124 and 128 as shown in FIG. 7, the beam 102 is reflected to the left, thereby connecting the terminals 118 on the RF input transmission line 104 to the terminal 116 on the RF output transmission 106.

An alternate embodiment of the broadband power switch is illustrated in FIG, 8. This embodiment is similar to the embodiment illustrated in FIGS. 5-7, except it includes two transverse beams 142 and 144. The broadband power switch 140 includes an input RF microstrip transmission line 146 having a plurality of terminals 148, 150, 152 and 154. Two output RF transmission lines are provided. The first output RF transmission line 156 is provided with a pair of terminals 160 and 162. Similarly, the second RF output transmission line 158 provides a pair of output terminals 164 and 166.

The beams 142 and 144 are rigidly attached on each end to the substrate (not shown) by way of a plurality of end posts 168, 170, 172, 174. In order to cause deflection of the beams 142, 144, a plurality of control pads 176, 178, 180, 182, 184, 186, 188 and 190 are provided. Application of the biasing voltage, *for example +25V,* to the various control pads [176-190] *176, 178, 180, 182, 184, 186, 188 and 190* causes deflection of the beams 142, 144 to connect various terminals 148, 150, 152 and 154 on the RF input transmission line 146 to be connected to various terminals 160, 162, 164 and 166 on the RF output transmission lines 156 and 158 respectively. As shown, applying a biasing voltage to the control pads 176, 180, 184 and 188 causes the beams 142 and 144 to deflect to the left (FIG. 8) as shown. This deflection connects the RF input terminals 148 and 152 to the terminals 160 and 162 on the RF output transmission line 156. Similarly, applying a biasing voltage, *for example, +25V,* to the control pads 178, 182 186 and 190 causes the beams to deflect to the right. This deflection connects the RF input terminals 150 and 154 to the terminals 164 and 166 on the RF output transmission line 158.

Figure 9A:
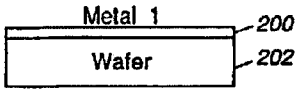
FIGS. 9A-9J are exemplary process flow diagrams for fabricating the air bridge and seesaw type switches illustrated in FIG. 1-4.
Figure 9B:
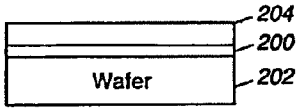
Figure 9C:
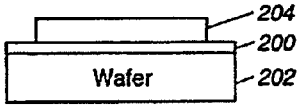
Figure 9D:
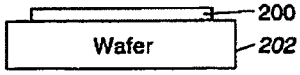
Figure 9E:
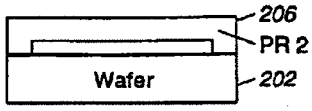
Figure 9F:
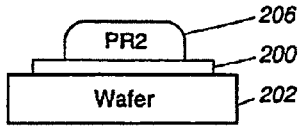
Figure 9G:
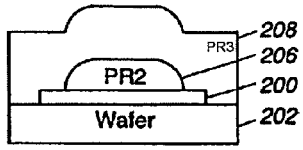
Figure 9H:
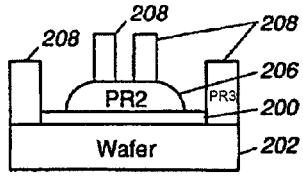
Figure 9I:
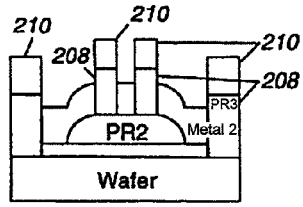
Figure 9J:
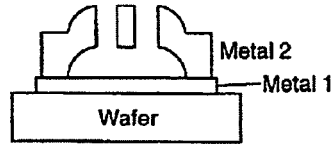
Figure 10A:
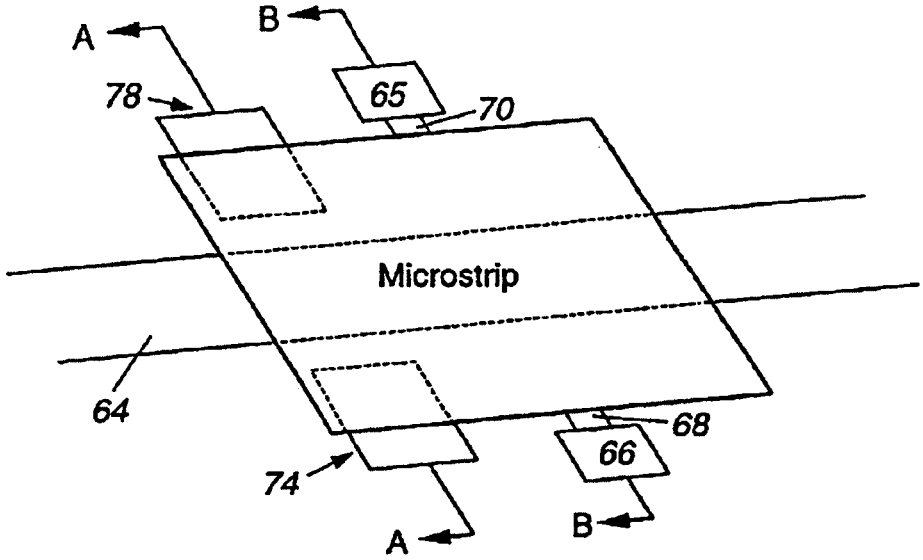
FIGS. 10A-10C are diagrams identifying the various metal layers for the seesaw type switches illustrated in FIGS. 3 and 4.
Figure 10B:
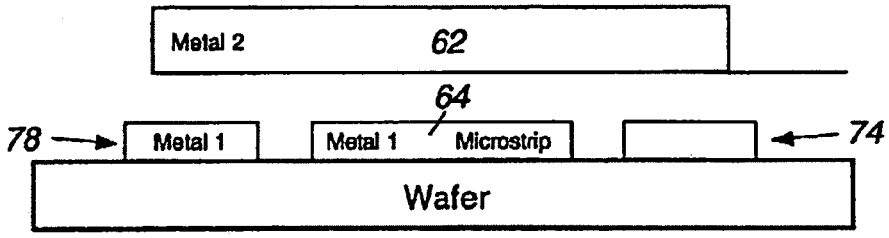
Figure 10C:
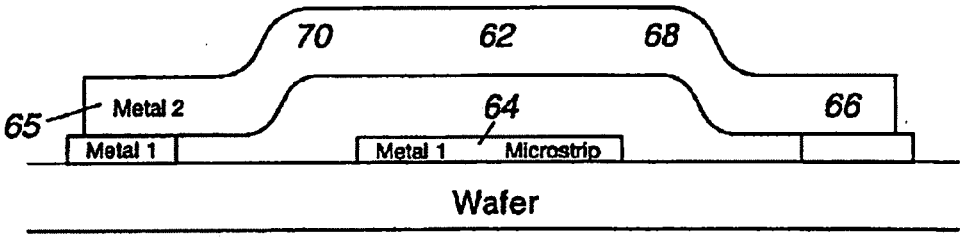

Fabrication details for the planar air bridge grounding switch, seesaw switch and broadband power switch are illustrated in FIGS. 9A-9J. In particular, FIGS. 9A-9J illustrate an exemplary process of forming both the air bridge and seesaw switches illustrated in FIGS. 1-8. FIGS. 10A-10C *illustrate a microstrip and* identify the metalization layers of the seesaw switches illustrated in FIGS. 3A and 4.

Referring to [FIGS.] *FIG.* 9A[-9J], the process is initiated by depositing a thin metalization layer 200 on a wafer or substrate 202. The metalization layer 200, identified as "METAL 1", may be applied by conventional techniques. The metalization layer 200 may be deposited, for example to a thickness of 1000 angstroms.

As shown in FIG. 10C, the METAL 1 layer 200 may be used for forming interconnections under the air bridge. For example, in the embodiments of the air bridge shunt switch illustrated in FIGS. 1 and 2 and the broadband power switch, illustrated in FIGS. 5-8, the thin metal layer 200 is used to continue the transmission line under the bridge. A photoresist layer 204 is deposited over the METAL 1 layer 200, as shown in FIG. 9B. The photoresist layer 204 is spun onto the METAL 1 layer 200 by conventional techniques. The photoresist layer 204 is then patterned and developed, as shown in FIG. 9C. The METAL 1 layer 200 is then etched, and then the photoresist layer 204 is stripped, as shown in FIG. 9D. A second photoresist layer 206 is applied as shown in FIG. 9E. The second, sacrificial photoresist layer 206 is patterned and hard baked, as generally shown in FIG. 9F. This layer is hard baked to prevent development in the next process steps. Next, as shown in FIG. 9G a third photoresist layer 208 is spun on top of the substrate 202, METAL 1 layer 200 and second photoresist layer 206, as generally shown in FIG. 9G. The third photoresist layer 208 is then patterned for the second metal layer METAL 2, as generally shown in FIG. 9H. After the third photoresist layer 208 is patterned, the second metal layer METAL 2, generally identified with the reference numeral 210 (*FIG. 9I*), is deposited thereupon by conventional techniques.

The second metal layer 210 is a relatively thick metal layer, for example 20,000 angstroms and is used to form the air bridge and raised contacts that need to be at the same height as the bridge. The thick metal layer 210 is also deposited on the transmission line away from the bridge and other electrodes in order to reduce resistance. Finally, as shown in FIG. 9J the second metalization layer 210 is "lifted off" and the photoresist rinsed off to leave only portions of the metal contacting METAL 1 or the substrate.

The process for making the seesaw switch, as illustrated in FIGS. 3A and 4 is the same as illustrated in FIGS. 9A-9J. In particular, a thin metal layer, identified as METAL 1 which may be for example 2,000 angstroms is deposited directly on the substrate. A relatively thick metal layer, identified as METAL 2, for example 20,000 angstroms, is elevated in places by use of the sacrificial photo METAL 2 resist layer 206. The second metal layer 210 is elevated for the seesaw and the two torsion bars. The METAL 1 layer, identified with the reference numeral 200, is used by itself for interconnections under the seesaw so that it passes through without touching it. For example, in FIG. 3A, the thin metal layer METAL 1 is used to continue the transmission line under the seesaw. The thin layer, METAL 1 may also be used for the control electrodes. The thick metal layer, METAL 2 may also be deposited on the transmission line away from the seesaw and other electrodes to reduce resistance.

FIGS. 10A-10C illustrate the placement of the metal layers, METAL 1 and METAL 2 (*FIGS. 10B and 10C*) in the formation of seesaw type switches illustrated in FIGS. 3A and 4. *As shown, the see saw switch 62 (see FIGS. 10b, 10c) includes a transmission line 64, a pair of control pads 74 and 78, as shown in FIGS. 10a and 10b, end posts 65 and 66 and torsion bars 68 and 70, as shown in FIGS. 10a and 10b.*

Obviously, many modifications and variations of the present invention are possible in light of the above teachings. In particular, each embodiment can be configured with coplanar lines rather than microstrip lines. Thus, it is to be understood that, within the scope of the appended claims, the invention may be practiced otherwise than as specifically described above.

What is claimed and desired to be covered by a Letters Patent is as follows:

[1. A ground switch for use in millimeter wave applications, the grounding switch comprising:

a transmission line defining an RF input and an RF output at opposing ends;

an RF contact formed on said transmission line;

one or more ground contacts adapted to be connected to ground, spaced apart from said transmission line and an air bridge, for grounding said transmission line;

an air bridge beam formed adjacent said transmission line, said air bridge beam rigidly connected to a substrate at each end, said beam spaced away from said RF contact and said one or more ground contacts in an at rest position and configured to contact said RF contact and said one or more ground contacts in an actuated position; and one or more control pads disposed adjacent said transmission line, said one or more control pads adapted to receive biasing voltage to cause said beam to deflect to said actuated position.]

[2. The ground switch as recited in claim 1, wherein said air bridge is generally transverse to said transmission line.]

[3. The ground switch as recited in claim 2, wherein said RF ground contact is formed on said transmission line.]

[4. The ground switch as recited in claim 3, wherein said air bridge beam is formed above said transmission line.]

5. [The ground switch as recited in claim 4] *A ground switch for use in millimeter wave applications, the ground switch comprising:*

*a continuous transmission line defining an RF input and an RF output at opposing ends;*

*an RF contact formed on said transmission line between the RF input and RF output;*

*one or more ground contacts adapted to be connected to ground, spaced apart from said transmission line and an air bridge, for grounding said transmission line;*

*an air bridge beam having a metal portion and formed adjacent said transmission line, said air bridge beam rigidly connected to a substrate at each end, said beam spaced away from said RF contact and said one or more ground contacts in an at rest position and configured so that the metal portion of the air bridge beam makes contact with said RF contact and said one or more ground contacts in an actuated position to form an RF conductive path to ground for the RF contact; and*

*one or more control pads disposed adjacent said transmission line, said one or more control pads adapted to receive biasing voltage to cause said beam to deflect to said actuated position,* wherein said one or more ground contacts are formed on the same side of said air bridge beam as said RF contact.

6. The ground switch as recited in claim [1] *5*, wherein said air bridge beam is generally parallel to said transmission line.

7. [The ground switch as recited in claim 6,] *A ground switch for use in millimeter wave applications, the ground switch comprising:*

*a continuous transmission line defining an RF input and an RF output at opposing ends;*

*an RF contact formed on said transmission line between the RF input and RF output;*

*one or more ground contacts adapted to be connected to ground, spaced apart from said transmission line and an air bridge, for grounding said transmission line;*

*an air bridge beam having a metal portion and formed adjacent said transmission line, said air bridge beam rigidly connected to a substrate at each end, said beam spaced away from said RF contact and said one or more ground contacts in an at rest position and configured so that the metal portion of the air bridge beam makes contact with said RF contact and said one or more ground contacts in an actuated position to form an RF conductive path to ground for the RF contact; and*

*one or more control pads disposed adjacent said transmission line, said one or more control pads adapted to receive biasing voltage to cause said beam to deflect to said actuated position,* wherein said RF contact and said one or more ground contacts are formed on opposing sides of said air bridge beam.

[8. The ground switch as recited in claim 1, wherein at least two or more control pads are provided.]

9. [The ground switch as recited in claim 8,] *A ground switch for use in millimeter wave applications, the ground switch comprising:*

*a continuous transmission line defining an RF input and an RF output at opposing ends;*

*an RF contact formed on said transmission line between the RF input and RF output;*

*one or more ground contacts adapted to be connected to ground, spaced apart from said transmission line and an air bridge, for grounding said transmission line;*

*an air bridge beam having a metal portion and formed adjacent said transmission line, said air bridge beam rigidly connected to a substrate at each end, said beam spaced away from said RF contact and said one or more ground contacts in an at rest position and configured so that the metal portion of the air bridge beam makes contact with said RF contact and said one or more ground contacts in an actuated position to form an RF conductive path to ground for the RF contact; and*

*one or more control pads disposed adjacent said transmission line, said one or more control pads adapted to receive biasing voltage to cause said beam to deflect to said actuated position,* wherein said control pads are formed on *at least* one side of said air [bridged] *bridge* beam.

[10. The ground switch as recited in claim 8, wherein said control pads are formed on both sides of said air bridged beam.]

*11. The ground switch of claim 5 wherein the air bridge beam comprises a layer of movable metal and the RF contact extends outwardly from said transmission line.*

*12. The ground switch of claim 7 wherein the air bridge beam comprises a layer of movable metal and the RF contact extends outwardly from said transmission line.*

*13. The ground switch of claim 9 wherein the air bridge beam comprises a layer of movable metal and the RF contact extends outwardly from said transmission line.*

*14. The ground switch of claim 5 wherein the air bridge beam deforms in the actuated position so that an intermediate portion of the air bridge beam bends towards the transmission line.*

*15. The ground switch of claim 7 wherein the air bridge beam deforms in the actuated position so that an intermediate portion of the air bridge beam bends towards the transmission line.*

*16. The ground switch of claim 9 wherein the air bridge beam deforms in the actuated position so that an intermediate portion of the air bridge beam bends towards the transmission line.*

*17. The ground switch of claim 5 wherein the air bridge beam is disposed to move as a seesaw from the at rest position to the actuated position.*

*18. The ground switch of claim 7 wherein the air bridge beam is disposed to move as a seesaw from the at rest position to the actuated position.*

*19. The ground switch of claim 9 wherein the air bridge beam is disposed to move as a seesaw from the at rest position to the actuated position.*

*20. The ground switch recited in claim 5, wherein said air bridge beam is generally transverse to said transmission line.*

*21. The ground switch recited in claim 7, wherein said air bridge beam is generally transverse to said transmission line.*

*22. The ground switch recited in claim 9, wherein said air bridge beam is generally transverse to said transmission line.*

* * * * *